Nov. 29, 1960
A. L. THURSTON
2,962,274
VEHICLE LOAD DETECTOR
Filed April 3, 1956
2 Sheets-Sheet 1
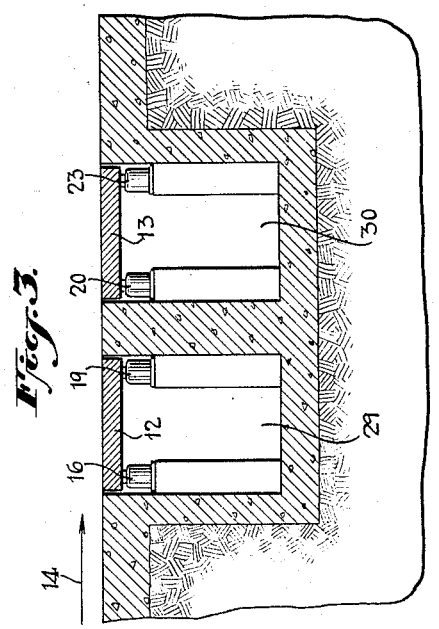
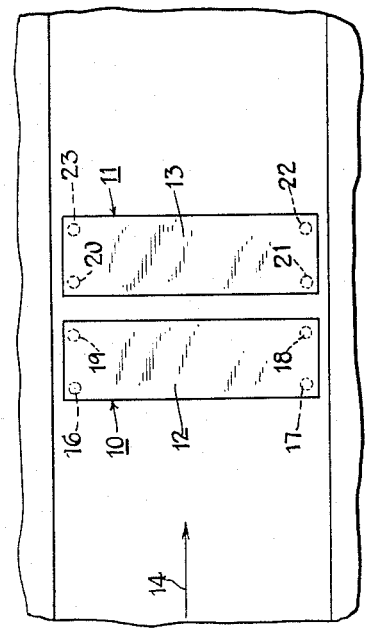
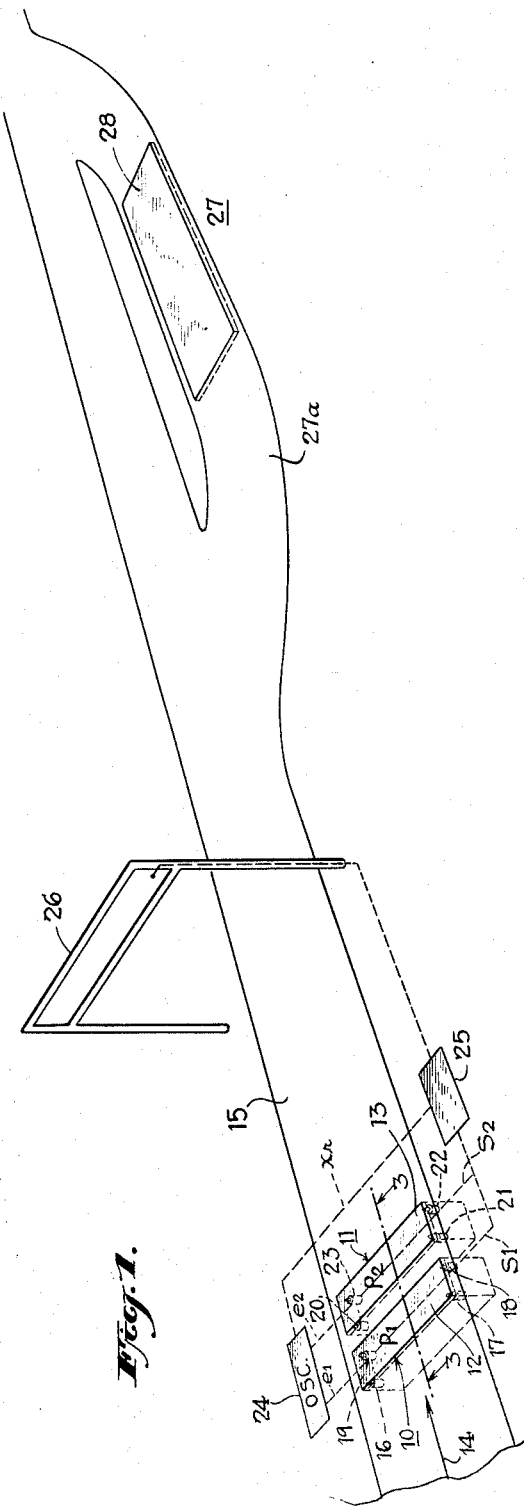
INVENTOR.
ARTHUR L. THURSTON.
BY
ATTORNEYS.

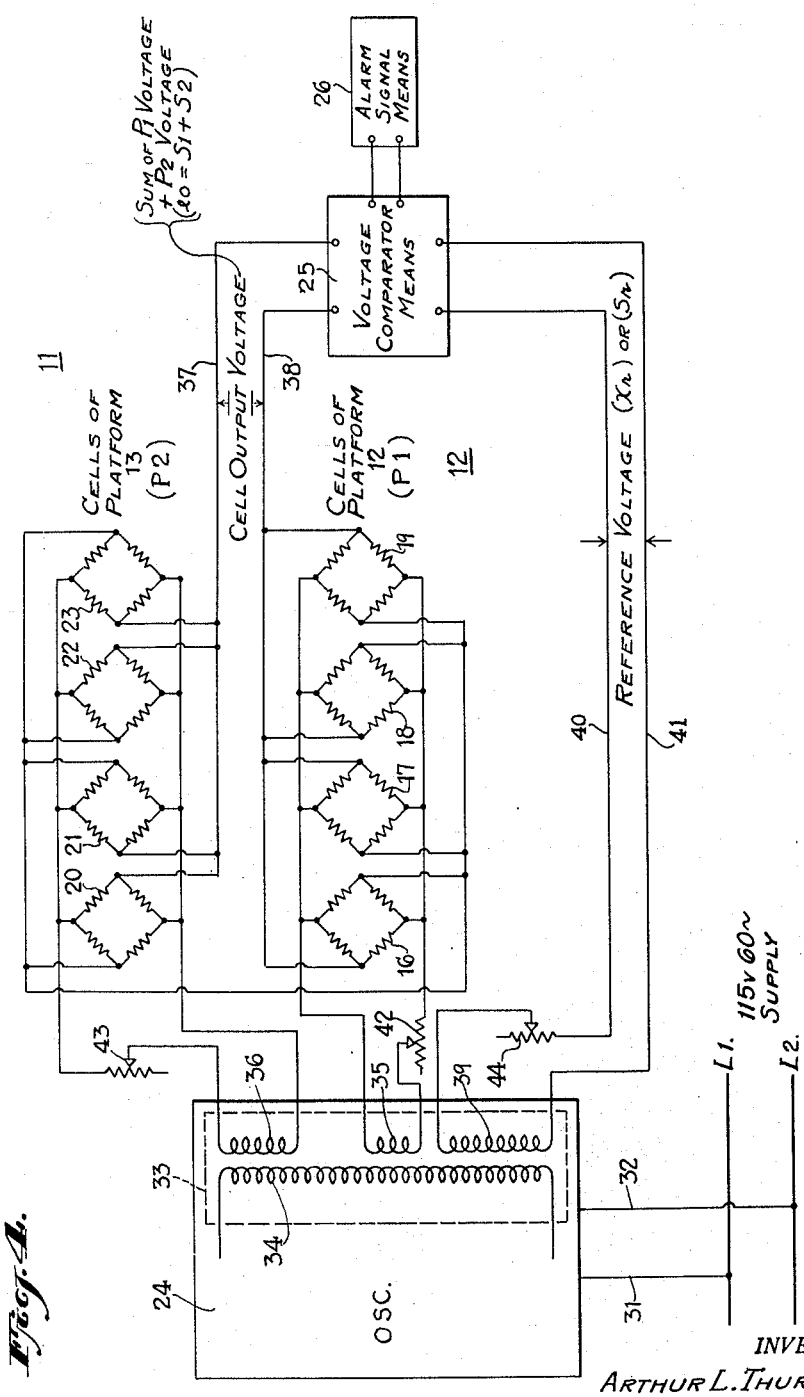

United States Patent Office 2,962,274
Patented Nov. 29, 1960

2,962,274

VEHICLE LOAD DETECTOR

Arthur L. Thurston, Cheshire, Conn., assignor to Revere Corporation of America, Wallingford, Conn., a corporation of New Jersey Filed Apr. 3, 1956, Ser. No. 575,775

16 Claims. (Cl. 265—27)

This invention relates to weighing means, and more particularly to means embraced within a single weighing device for automatically and substantially instantaneously detecting an overload upon either a single or a tandem axle assembly of a vehicle while in motion at normal highway speed.

To prevent damage to highways, the governments of the several States of the United States and governments in other jurisdictions have passed laws which limit the weight or load allowable upon axles of vehicles, such as trucks, semi-trailers, trailers and the like within their respective jurisdictions. The expressions "weight of an axle" or "load upon an axle" as employed herein refer to the force which the tires upon such axle exert upon the surface of a road.

Most governments enforce such laws by maintaining vehicle or truck weighing stations at selected locations on their highways. Such inspection or weighing stations are normally located upon an auxiliary lane which is parallel to the main highway in which lane a platform scale or scales are placed. It is normal practice to require all trucks, semi-trailers, trailers and the like vehicles, unless obviously empty, to drive off of the main highway and into such auxiliary lane where they are inspected and weighed. When such truck traffic is heavy, the trucks may form long lines to await their turn to be weighed. This results in substantial inconvenience to and delay in the flow of commerce via such trucks. In order to overcome these disadvantages, weighing platforms employed in the present invention are installed in the main highway flush with the surface thereof a suitable distance ahead of such truck weighing station and the novel overload detection means of the present invention detect those trucks which are close to or in excess of the legal weight limit, and suitable alarm signal means, such as an illuminated sign, is employed to instruct the drivers of such trucks to drive their vehicles into the auxiliary lane for further action which may include further weighing and/or imposition of fines. All other trucks are allowed to proceed along the highway without stopping. Since usually less than one percent of the trucks are in excess of the legal weight limit, delays and inconvenience heretofore occasioned are reduced to a minimum.

For detecting overloaded single axles, it has been heretofore proposed to employ a weighing platform or weighbridge which is mounted in a weighing pit with the surface thereof flush with the surface of the traffic lane and supported by load cells known as electronic weighing cells which contain stress receiving columns carrying electrical resistance type strain gauges bonded thereto. The weight applied to the platform by a vehicle passing over it produces changes in the electrical characteristics of the strain gauges which, by suitable electronic means, provide an indication of the weight of the vehicle. Illustratively, such electronic weighing cells may be of the type described in my U.S. Patent 2,488,349. The aforementioned platform or weighbridge may be relatively narrow, for example, about three feet in the direction of travel and substantially the same width as the traffic lane.

For detecting overloaded tandem axles, it has been proposed, in lieu of such relatively narrow platform, to employ a wider one, for example, of seven or eight feet as measured in the direction of travel, similarly resting upon such load cells and upon which all of the tires of a tandem axle assembly can be supported simultaneously.

Thus such prior proposals for the detection of both overloaded single and tandem axles have required two separate weighing means necessitating an expensive duplication of instrumentation.

Furthermore, it has been suggested to employ a single platform similarly supported for the detection of overloads upon either single or tandem axles, which single platform, as aforementioned, must be of sufficient dimension in the direction of travel to support all of the wheels upon a tandem axle assembly, for example, seven or eight feet. However, such prior suggestions have required the employment of complicated and undesirable means for differentiating between single and tandem axles and means for adjusting the operation of the apparatus to suit either the single or tandem axle, for example, the switching of input voltages to the weighing cell circuits to accommodate the appropriate statutory weight limit for either single or tandem axles. It has been suggested that such means for differentiating between single and tandem axle assemblies for overload detection upon such single platform comprise, illustratively, electrical wheel-operated switch devices which normally would be placed in the highway adjacent to the entrance to such platform and so disposed that the wheels of a tandem axle assembly will operate such switch devices in a characteristic manner distinct from the operation thereof by the wheels of a single axle assembly. Such switches which are wheel-operated at highway speeds have many disadvantages including the fact that they usually cause the wheels to bounce and give erroneous weights. Also, the changing of voltages, which may be of the order of microvolts in the short time interval required, for example, a few milliseconds, is difficult to accomplish and can produce errors in weight detection.

One of the objects of the present invention is to overcome the above difficulties or to reduce same to insignificance.

A further object is to provide in a single weighing means a relatively simple and inexpensive device for detecting overloads automatically upon either single or tandem axle assemblies, such device operating within a narrow error tolerance, and without the need for a human operator.

The invention, in one aspect thereof, comprises a novel scale means for detecting overloads upon either single or tandem axle assemblies of vehicles where a first load limit $x$ has been estalished for the wheels of a single axle of a vehicle, and a second load limit $y$ established for the wheels of a tandem axle assembly of a vehicle. Force sensitive means comprising scale means are employed having two weighing platforms mounted with the top surfaces thereof level with the road surface and situated in series in the path of a vehicle moving on such surface to support, in the case of a tandem axle assembly, simultaneously and respectively the loads of such tandem axle, one upon each platform. Thus the platforms are so located in the road that either one of the two platforms will support a single axle assembly, but both platforms cannot support such single axle simultaneously. Such platforms are referred to as the first and second platforms, in the order of occurrence in the direction of travel on the road. Each platform is mounted upon its respective weight or force sensitive means which is capable of producing an output signal or energy in response to the load thereupon, for example, upon the weighing cells described in the aforementioned Patent 2,488,349. Thus, such two platforms and their weight sensitive means comprise a first and a second scale, and their respective output signals are referred to as $S_1$ and $S_2$. One of such scales, for example, the second, is selected for producing the output signal $S_2$ which is to be examined for determination of an overload upon a single axle. Suitable signal sensing means are provided which are sensitive to $S_2$ reaching or exceeding that value which indicates that the single axle load (W) is equal to or greater than the established limit $x$. That is, the second scale produces a signal which is a selected function of the load or weight upon the second platform, i.e., $S_2 = (f_1)W$. Illustratively, where the single axle load limit $x$ is established at 18,000 pounds, such signal sensing means, being connected to the second platform weight sensitive means, will provide an indication, e.g. by lighting a lamp, whenever such single axle load equals or exceeds such limit. Such signal sensing means illustratively comprises means for producing a reference signal $S_r$ with which $S_2$ is compared by suitable comparing means. When $S_2$ equals or exceeds $S_r$ such overload indication is made by any suitable means such as the lamp or illuminated sign aforementioned. Thus $S_r = (f_1)x$. The aforementioned signal sensing means, in the latter example, thus embraces the means for producing the reference signal $S_r$, and comparing same with $S_2$. For determination of an overload upon a tandem axle assembly, where $W_1$ and $W_2$ are the loads upon the leading and trailing axles respectively, both of the signals $S_1$ and $S_2$ are examined and in order to reduce expense and simplify the novel scale means the signals $S_1$ and $S_2$ are combined, e.g., added, and the result compared with the same reference signal $S_r$. Thus $S_r$ is a common reference for both single and tandem axle loads. In order that $S_r$ can be so employed, the output signal $S_1$ (other than the one selected for single axle overload detection) must be changed in character, for example, reduced relative to $S_2$. Accordingly, means are employed for causing the first scale to produce $S_1$ bearing a selected ratio $(r)$ to $S_2$ in such a way that when $S_1$ is combined with $S_2$, e.g. added, the result also can be compared to $S_r$ for overload detection purposes. For example, if the single and tandem axle load limits are respectively 18,000 and 32,000 pounds and a vehicle having a single axle load of 18,000 pounds passes over the novel scale means of the invention, the second scale will produce the signal $S_2$ which is a function of 18,000 pounds and which thus equals $S_r$, and the overload indicator will be actuated. If the vehicle has a tandem axle load of 32,000 pounds, for illustration assume equal distribution of the load and thus that each of the two axles is loaded to the extent of 16,000 pounds, that is $W_1 = W_2$. Hence when the two axles are respectively supported on the two platforms, the second scale will produce a signal $S_2$ which is a function of 16,000, i.e., $S_2 = (f_1)W_1$. But the first scale must produce a signal $S_1$ which is of the ratio $r$ to $S_2$ in order for $S_1 + S_2$ also to be comparable to $S_r$. That is, $S_1 = r(f_1)W_2$. Hence, in this case, $S_1$ is a fraction of $S_2$. Since the tandem axle load, in this example, is at its limit and since $2,000 + 16,000$ will produce the sum which will cause $S_1 + S_2$ to equal $S_r$ and to trigger the alarm signal means, it is seen that the first scale should be adapted for producing a signal $S_1$ at the ratio $$\frac{2.000}{16,000} = \frac{1}{8}$$

to the signal $S_2$. Hence $$r = \frac{1}{8}$$

This ratio is also determined as follows:

$$r = \frac{2x - y}{y}$$

Thus when the loads upon the platforms supporting a tandem axle are equal to or in excess of the statutory limit, the following are respectively satisfied:

(a) $\quad r \cdot \dfrac{y}{2} + \dfrac{y}{2} = S_r$ (b) $\quad r \cdot \dfrac{y}{2} + \dfrac{y}{2} > S_r$ For those loads less than the limit, the Equation $a$ will not be satisfied and the alarm signal will not be produced. The expression $$r \cdot \frac{y}{2}$$

in Equation $a$ represents the signal $S_1$ produced by the first scale when the tandem axle load is at its limit and the expression $$\frac{y}{2}$$

represents the signal $S_2$ produced by the second scale also at such load limit. The latter expression $$\frac{y}{2}$$

thus is one-half of the tandem axle limit or the average load upon one of the axles of a tandem assembly, assuming equal weight distribution.

Thus a single overload detection apparatus can, with equal accuracy, be employed for detecting overloads of both single and tandem axle assemblies. The signals $S_1$ and $S_2$ can be, for example, in terms of voltages as in the form of the present invention to be described below. These signals are compared to said reference signal $S_r$ which, of course, is in the same terms but which is a function of the single axle weight limit $x$. It is preferable but not necessary for the first encountered of the scales to produce the relatively smaller signal $S_1$ as compared to $S_2$ for reasons which will be apparent from the description hereinafter set forth. The invention can be employed for measuring the loads of axle assemblies in excess of two, for example, triple or quadruple axle assemblies. In such cases a number of separate platforms are employed which are equal to the number of axles to be weighed. In such arrangement the last weighing platform to be encountered in the direction of travel is constructed and arranged to produce the signal $S_1 = (f_1)W$ and the signals $S_2$ and $S_3$ and so on as produced by each of the other scales are at the ratio $r$ to $S_1$, such ratio being determined as follows:

$$r = \frac{S_1}{S_2} = \frac{zx - y}{(z-1)y}$$

where $z$ is the number of axles of the assembly. In such a device for detecting overloads upon axle assemblies having more than two axles, means are also employed for combining or adding the signals $S_1$, $S_2$, $S_3$ etc. which occur simultaneously upon the weighing platforms and an alarm device is actuated in response to such sum reaching the value $S_r$ not less than a selected limit which also is a function of $x$. For example, where such signals are in voltages, a reference voltage $x_r$, which is a function of $x$, is produced, the sum or combination of the weighing platform voltages is compared to such reference voltage and the alarm device actuated when such sum is in excess of $x_r$ or bears some other selected relation to $x_r$. The outputs of the groups of cells producing the signals $S_1$, $S_2$, $S_3$ etc. may be totalized, for example, by connecting the cells in series wherein the inputs to each cell bridge are fed by independent sources, usually separate output windings of a transformer. Or the inputs to one group of cell bridges may be fed by one output winding of a transformer and the input to another group of cell bridges may be fed by a separate output winding of a transformer. Since the voltage across the output terminals of each bridge circuit is "floating," that is, has no reference to any base, the outputs can be connected in series so that they add and totalize in this manner.

In the above computations it is assumed that the tandem axle load limit $y$ will never exceed twice the single axle load limit $x$. And it is further assumed that when the tandem axle load limit $y$ is in fact twice the single axle load limit $x$, then it is not necessary to determine the ratio $r$ but it is desirable: (1) to suspend or put out of operation the first platform; and (2) to adjust the instrument to be operable solely by the second weighing platform and to produce the alarm signal when $S_2=S_r$. That is, where $y=2x$ then $r$ can be disregarded and the novel apparatus embodying the invention adjusted to "trigger" when the signal $S_2$ from the second platform equals or exceeds the value $S_r$. In this case the weighing means of the first platform can be disconnected or need not be installed in the first place unless some future need therefor is forecast. Instead of measuring a force, such as the weight of a body, the present invention can be employed for measuring automatically any physical quantity which can be converted to a variable electrical parameter. Such term "physical quantity" includes such quantities as force, speed, acceleration, motion and temperature. The term "electrical parameter" includes, for example, resistance, capacitance, inductance, or any combination thereof. Thus it is within the purview of the invention to employ means other than the above-described weighing cells having electrical resistance type strain gauges. For example, the electrical characteristics of a stress sensitive circuit can be varied by controlling the distance between condenser diaphragms whereby a change in capacitance can be measured. And it is possible to employ a change in inductance due to the action of such physical quantities as those above mentioned whereby an air gap can be varied under the influence of such physical quantity. Also devices for measuring magnetostrictive effect can be employed instead of the weighing cells herein mentioned. Certain ferromagnetic substances have electrical characteristics whereby their permeability can be varied in response to stress applied thereto. Nickel or ferronickel alloys are examples of highly sensitive substances, the permeability of which can be varied in response to stress. Such ferromagnetic substance can be provided with a coil surrounding it and the inductance of such coil will reflect the change in permeability of its ferromagnetic core in response to changes in stress applied to the latter. The expressions "electro-responsive means" or "electro-responsive element" as used herein includes any device, such as the weighing cell disclosed, an electrical characteristic of which is responsive to a physical quantity such as those set forth above.

Accordingly, a plurality (e.g. two) of force sensitive devices, such as the aforementioned scales, are employed. Such force sensitive devices each are constructed and arranged in a well known manner for producing output energy which is a selected function or representative of the force exerted thereupon. Also, means are employed for detecting when the output energy of a selected one of such two force sensitive devices reaches a selected value representative of, for example, 18,000 pounds, which value comprises a first pre-established force limit. Also, means are provided for combining the simultaneously occurring output energies of such devices. In order to reduce the extent of instrumentation required in this construction, the same detecting means are employed for detecting when such simultaneously occurring and combined output energies of said devices reach the same selected value mentioned above, for example, 18,000 pounds. In order for such common detecting means to be so employed, there are also provided means for acting upon the other device, that is, other than such selected device, to cause such combined energies to reach such same selected value in response to simultaneous application to each device of its proportional share, e.g. one half, of a second and larger pre-established force limit such as 32,000 pounds. Accordingly, and illustratively, 16,000 pounds applied to such selected device will create output energy representative of 16,000 pounds, but this weight (16,000 pounds) applied to the other device will create output energy representative of 2,000 pounds (that is, a fraction of the load applied to the selected device) whereby the combined energies will be representative of said first mentioned 18,000 pounds.

The above and further objects and novel features will more fully appear from the detailed description given below when the latter is read in connection with the accompanying drawings. It is to be understood that the drawings are for purposes of illustration only and are not intended as a definition of the limits of the invention, reference for this latter purpose being had to the appended claims.

In the drawings:

Fig. 1 is a perspective and schematic view of one form of apparatus embodying the present invention;

Fig. 2 is a fragmentary plan view of a pair of weighing platforms as employed in the present invention;

Fig. 3 is a transverse sectional view taken substantially along line 3—3 of Fig. 1; and Fig. 4 is a simplified wiring diagram showing schematically one plan for electrically interconnecting certain of the elements of the present invention.

Referring to the drawings, the apparatus embodying the present invention comprises a pair of electronic scales 10 and 11 including respectively weighing platforms 12 and 13 which are situated in series in the path of vehicles moving in the direction of arrow 14 along a roadway or traffic lane 15. The weighing platforms 12 and 13, for example, can be about three feet long in the direction of travel of such vehicles and substantially the same width as the traffic lane. Each weighing platform is supported by weight responsive means, preferably but not necessarily by a plurality of electronic weighing cells of a type disclosed in the aforementioned U.S. Patent 2,488,349. Each weighing platform is supported by four such electronic weighing cells, one at each corner. Platform 12 thus is supported by the weighing cells 16, 17, 18 and 19 and platform 13 by the cells 20, 21, 22 and 23. It is, of course, understood that a different number of weighing cells may be employed if desired.

Such weighing cells in one form thereof when fed with a constant input voltage produce an output voltage proportional to the weight on the cells. For overload detection purposes, the aforementioned reference voltage ($x_r$) is established by suitable means equal to the output cell voltage at the detection weight limit, and means are provided to indicate when the cell output voltage equals or exceeds such reference voltage. Thus an oscillator 24 is provided for furnishing the voltage inputs to the two sets of weighing cells which support the two weighing platforms. Such oscillator 24, for example, can be of a conventional feedback resistance capacitor type with a degenerated stabilized buffer stage which provides a source of carrier voltage of constant amplitude and constant frequency to the weighing cells. It also provides, by means to be explained hereinafter, the reference voltage $x_r$. The combined output cell voltages of the scales 10 and 11 are directed to a voltage comparator 25 where such combined voltage is compared to the reference voltage. If such combined voltage exceeds the reference voltage, the signal means 26 is actuated which instructs the driver of the vehicle to divert the latter to a main inspection station 27 situated in an auxiliary lane 27a where, if desired, a further weighing of the vehicle by means of a scale 28 can be carried out.

The platforms 12 and 13 are substantially parallel and are spaced about one foot apart so that the front axle of a tandem axle assembly will be supported on platform 13 at the same time that the rear axle of such tandem pair will be supported on platform 12. The overall distance of approximately seven feet from the entrance edge of platform 12 to the exit edge of platform 13 is such that two axles (other than in a tandem relation) cannot be supported on the platforms 12 and 13 at the same time. Such dimension of seven feet, of course, is to be determined by the wheel base of tandem axle assemblies. In vehicles of United States manufacture, the wheel base of tandem axle assemblies normally has varied between about forty-eight to fifty-three inches. The dimensions of the double platform weighing means of the present invention, of course, can be easily adapted to conform to the structural dimensions of the tandem axle assemblies of the vehicles they are to weigh whatever they may be.

Referring to Fig. 3, the platforms 12 and 13 are positioned within pits 29 and 30 with the top surfaces thereof level with the road surface and the platform sides disposed in such a manner that there is a clearance of the side walls of the pits thereby to prevent restriction of vertical movement of the platforms.

As discussed above, one of the principal objects of the present invention is to provide a single overload detection means, which, with a high degree of accuracy, can detect overloads of either single or tandem axle assemblies without the need for complicated means for differentiating between single and tandem axles and complicated voltage control devices for changing instrument voltages for the two separate weight limits. This is accomplished, in one form of the present invention, by establishing said reference signal $S_r$ (in this case the aforementioned voltage $x_r$) which is a function of the single axle weight limit, for example, 18,000 pounds and simultaneously comparing same with the output signals $S_1$ and $S_2$ of the scales 10 and 11 which are proportional to the loads thereupon and to the input voltages to their respective weighing cells. $S_1$ and $S_2$ are voltages in the form of the invention shown.

Thus a common reference voltage $x_r$ (or signal $S_r$) is employed as a reference for detecting overloads of both single and tandem axle assemblies. In order to be able to employ such a common reference voltage for both types of loads, the output voltage of one of the scales, in the form shown, is reduced. For example, the output voltage of the scale 10 is restricted to a fraction of the output voltage of the scale 11. This accomplished by applying an input voltage ($e_1$) to the circuit of the weighing cells of scale 10 which is a preselected fraction of the input voltage ($e_2$) to the circuit of the weighing cells of the scale 11. The ratio $r$ between said input voltages is determined as aforementioned, namely:

$$r = \frac{2x-y}{y}$$

where x is the single axle load limit and y is the tandem axle load limit.

The means for so relating such voltages or signals of the devices 10 and 11 are referred to as signal control means or output energy control means.

Thus, in the case of a single axle assembly moving over the two scales 10 and 11, the first scale 10 will produce an output voltage ($S_1$) which is only a fraction of the output voltage ($S_2$) of the second scale 11 and hence is not capable of reaching a value which is near the reference voltage $x_r$, the latter being established as a function of illustratively, 18,000 pounds. However, when the single axle passes over the scale 11, if the weight thereupon is equal to or greater than the weight limit of 18,000 pounds, an output signal or voltage $S_2$ will be produced which will equal or exceed the reference voltage $x_r$ and by means of the comparator device 25 will immediately actuate the alarm signal device 26 and instruct the driver to drive into the inspection station 27 where further weighing can be carried out for purposes of assessing a fine if required.

In the case of a tandem axle assembly, the front and rear axles thereof will simultaneously be supported by the platforms 13 and 12 respectively and assuming equal distribution of the load upon both axles, and further assuming that the load is at or above the 32,000 pound limit, the scale 11 will produce an output signal or voltage $S_2$ which is a function of 16,000 pounds, namely, one-half of the total of 32,000 pounds and the scale 10 will produce an output signal or voltage $S_1$ which is a fraction of $S_2$ and hence represents a fraction ($r$) of 16,000 pounds. Since $$r = \frac{2x-y}{y}$$

in this instance $$r = \frac{2 \cdot 18,000 - 32,000}{32,000} = \frac{1}{8}$$

Hence the first scale 10 will produce an outright voltage which is a function of $$\frac{1}{8} \cdot 16,000 = 2,000$$

On this cast adding or combining the voltages comprising output signals $S_1$ and $S_2$ produces a voltage which has a selected relation to said 18,000 pounds. Thus by the comparator means 25 the combined signals $S_1$ and $S_2$ are found to be equal to or greater than the reference voltage $x_r$ (or to have some selected relation thereto) whereupon the signal means 26 is actuated.

Referring to Fig. 4, the oscillator 24 is electrically connected to the power lines $L_1$, $L_2$ by means of leads 31, 32 and said oscillator is provided with an output transformer 33 having a primary coil 34. The primary coil 34 is electrically associated with the circuits of the electronic weighing cells of the two weighing platforms as follows: With respect to the weighing cells 16–19, inclusive, of the platform 12, such weighing cells include stress receiving column means carrying electrical resistance type strain gauges bonded thereto, there being at least two strain gauges in each cell which are subject to change due to stress applied to its respective column means. Each cell has two other resistors and such strain gauges and resistors of each cell are connected as a bridge wherein two opposite arms of each bridge are constituted by two of said strain gauges and the other two arms of the bridge are fixed resistances. By means of a secondary coil 35 and suitable connections, a conjugate arm of each of said bridges of the cells 16–19 is electrically energized at an input voltage $e_1$.

The weighing cells 20–23, inclusive, of platform 13 are of comparable construction and interconnection and the conjugate arms of their bridges are electrically energized at an input voltage $e_2$ by means of a secondary coil 36 and suitable connections.

Thus an input voltage is fed to two opposite corners of the cell bridge circuit of each cell, and an output voltage appears at the other two corners, that is, the other conjugate arms thereof.

As shown in Fig. 4, the cell bridge circuits of platform 12 (cells 16–19) are fed from the aforementioned coil 35 and the outputs of such cells are connected in parallel; the cell bridge circuits of the cells of platform 13 (cells 20–23), are fed from such second and separate winding 36 and their inputs and outputs are in parallel. The output of the cells of platform 12 is connected in series with the output of the cells of platform 13.

The combining of the output signals of said cells, whether of voltage or any other electrical parameter, can be accomplished in any well known manner, the means shown in Fig. 4 being one example.

Thus across cell output leads 37 and 38 there will appear the total cell output voltage $e_0$ comprising the sum of the output voltages of platforms 12 and 13. In the present form of the invention $e_0 = S_1 + S_2$.

The reference signal, which as aforementioned is referred to herein as $S_r$, in the present form of the invention comprises a voltage and, as also has been mentioned before, is represented by the symbol $x_r$. Such reference voltage has a selected relationship to the legal load limit for a single axle assembly, illustratively 18,000 pounds. Such reference voltage conveniently can be obtained by means of a secondary coil 39 which is electrically linked to the aforementioned primary coil 34 of the oscillator 24.

The reference voltage $x_r$ or the reference signal $S_r$ is compared to the cell output voltage $e_0$ in the comparing means 25 and whenever the cell output voltage reaches a preselected relationship to the reference voltage, for example, equals or exceeds such reference voltage, the element 25 is effective to actuate the signal means 26. The voltage comparator means, by way of example, can employ a well known differential relay to one side of which the reference voltage is applied and to the other side the voltage $e_0$. Examples of conventional voltage comparator means are found in the following U.S. Patents: 2,353,691, 2,439,891 and 2,615,936.

The signal or voltage comparator means 25 are electrically connected to the coil 39, for example, by the leads 40 and 41.

For the purpose of adjusting the input voltages $e_1$, $e_2$ and the reference voltage $x_r$, suitable means are provided, such as the variable resistors 42, 43 and 44 in the respective circuits of such voltages. By such devices or any other suitable means, the present invention can be adjusted to accommodate any selected statutory weight limits.

In operation, speaking in terms of pounds rather than voltages and understanding that output voltage is proportional to the weight, the instrument is adjusted so that it registers the true weight of an object placed upon the platform 13. It will then register a fractional portion of the weight of any object placed on the platform 12. Where $x$ and $y$ respectively are 18,000 and 32,000 pounds, the platform 12 will register one-eighth of the weight of the object placed thereon. The comparator element 25 is adjusted to trigger or actuate the alarm signal at 18,000 pounds placed upon platform 13 (there being no weight at the time upon platform 12). The instrument then will detect any single axle having a load of 18,000 pounds or over.

Assume that the weight upon a tandem axle assembly totals 32,000 pounds and that the weight upon each of the two tandem axles is 16,000 pounds. Since the instrument will, in the form shown, add or totalize the weights upon both platforms occurring simultaneously, to the 16,000 pounds on platform 13 there will be added one-eighth of the weight upon platform 12, namely, 2,000 pounds, which produces a total of 18,000 pounds. Thus when the detector is set for actuation or triggering at 18,000 pounds, the apparatus embodying the invention will detect the load upon single axles equal or in excess of 18,000 pounds and the load upon tandem axles equal to or greater than 32,000 pounds.

Tests have shown that the loads upon the individual axles of a tandem pair vary considerably from the average of the two. The weighing of such tandems also is complicated by the fact that there is a difference between the motion weight and the actual (or still) weight of any axle of a vehicle. Also tests have shown that the average difference between motion and still weights has been, for example, 600 pounds for a single axle and the first axle of a tandem pair and 2300 pounds for the second axle of such a tandem pair. If we assume that the actual or still weights were 16,000 pounds each, the motion weights would be:

*Example 1*

| | Pounds |
|---|---|
| First axle | 16,600 |
| Second axle | 18,300 |
| Total | 34,900 |

The percentage of error is $$\frac{2900}{32,000} = 9.07\%$$

The above computation is for a situation where each platform is to weigh fully without any diminution as it occurs in the present invention. With the apparatus embodying the present invention, the following motion weights would be obtained:

*Example 2*

| | |
|---|---|
| First axle | 16,600 pounds |
| Second axle | 2,290 pounds = $\frac{(18,300)}{8}$ |
| total | 18,890 pounds |

The percentage of error is $$\frac{890}{18,000} = 4.95\%$$

Further the empirical test data as to motion weighing of vehicles indicates that the weight in motion of the second axle almost always is higher than the actual or still weight but the first axle motion weight is sometimes above and sometimes below the actual or still weight. Assuming that the 600 pounds aforementioned is negative and the 2300 pounds is positive:

The percentage of error under the facts of Example 1

$$\text{above} = \frac{1700}{32,000} = 8.44\%$$

However, in the Example 2 where there is a diminution of the load as measured upon the second axle, the weights would be:

| | Pounds |
|---|---|
| First axle | 15,400 |
| Second axle | 2,290 |
| Total | 17,690 |

The percentage of error is—

$$\frac{310}{18,000} = 1.72\%$$

Twenty-three of the State Governments of the United States have established the limit of 18,000 pounds for the load upon a single axle and 32,000 pounds for a tandem axle assembly. Five of such States have limits of 18,000 pounds and 36,000 pounds for single and tandem axles respectively and in such case a single platform of the present invention is adjusted to weigh 18,000 pounds and the other platform need not be employed. Other examples of single and tandem load limits are 22,400 and 40,000 pounds; 22,000 and 30,000 pounds.

Reverting to the means for interconnecting the elements of the present invention, assume that the input voltages from the oscillation transformer of Fig. 3 are rectified so that the input voltages to the cells and also the reference voltage are D.C. voltages. Also assume that the output voltage, when 18,000 pounds are on the platform 13, is 18,000 microvolts, the reference voltage can be fed into a potentiometer whose adjustable contact is adjusted to some value, such as 18,000 microvolts, having a selected relation to the single axle load limit, such as 18,000 pounds. Interposed between such adjustable contact and the combined outputs of the weighing cells of the two platforms there may be connected a sensitive polarized relay. As is well known in the art and in a manner analogous to that disclosed in my Patent 2,723,844, wherein certain voltages are compared, a phase sensitive detector may be employed for feeding said sensitive polarized relay or a sensitive electronic trigger circuit. When the reference voltage is higher than the cell output voltage, the current flows through the coil of such polarized relay in one direction in which case the relay is ineffective to actuate the alarm signal means. However, when the cell voltage exceeds such reference voltage, the current is reversed, operating such relay to produce an overload indication.

What is claimed is:

1. In apparatus of the class described, a plurality of force sensitive devices; means operatively connected to such devices for causing them to produce output energies which are respectively selected functions of the forces exerted thereon; means for detecting the output energy of a predetermined one of such devices reaching a selected reference value bearing a selected relation to a first pre-established force limit; means for combining the output energies of said devices simultaneously occurring; such last-named energy combining means being operatively associated with such detecting means for detecting the combined output energies simultaneously occurring of such devices reaching such same selected reference value; and the aforementioned means for acting upon those devices other than such predetermined one being constructed and arranged to cause such combined energies to reach such same selected value in response to simultaneous application to each such device of its proportional share of a second and larger pre-established force limit.

2. In apparatus of the class described, a plurality of force sensitive devices, each of such devices being constructed and arranged for producing an output signal; signal control means for adapting a selected one of such devices to produce its signal as a first selected function of the force applied thereto, and for adapting the other of such devices to produce their signals each as a second selected function of the force applied thereto; means for combining the signals of such devices simultaneously occurring; such signal control means being constructed and arranged to relate such first and second functions to cause such devices to produce signals in response to forces simultaneously applied to such devices, which signals when combined by such signal combining means produce not less than a selected value in response to the combination of such forces being not less than one pre-established force limit; such last-named value at its minimum being substantially the same as the lowest value of the signal produced by such selected one of such devices in response to another force applied thereto, the latter force being not less than another and smaller force limit; and common means for detecting such lowest selected value.

3. In apparatus of the class described; a plurality of force sensitive devices, such force sensitive devices being constructed and arranged for producing output energies which are functions of the forces exerted respectively thereupon, means for combining such output energies simultaneously occurring attributable to such forces simultaneously exerted thereupon, means for controlling the output energies of all but a selected one of such force sensitive devices to be in a selected relation to the output energy of such selected force sensitive device in accordance with the expression $$\frac{zx-y}{(z-1)y}$$

where $x$ and $y$ are preselected values of differing force limits and $z$ is the number of such force sensitive devices, and means for detecting such combined output energies simultaneously occurring reaching a reference value bearing a selected relation to one of such force limits, such latter means being constructed and arranged for detecting the output energy of such selected device reaching the same reference value last mentioned, whereby a single detecting means is employed for the combined output energies and also that of said selected device.

4. In apparatus of the class described: a plurality of force sensitive devices, such force sensitive devices each producing an output energy which is a function of the force exerted thereupon, means for combining such output energies attributable to such forces simultaneously exerted thereupon, means for controlling the output energy of all but a selected one of such force sensitive devices to be in a selected quantitative relation to the output energy of such selected force sensitive device in accordance with the expression $$\frac{zx-y}{(z-1)y}$$

where $x$ and $y$ are preselected values of differing force limits and $z$ is the number of such force sensitive devices, and a single means for detecting the output energy of said selected device reaching a preselected reference value the same detecting means being constructed and arranged to detect the output energy of said selected device combined with that of the other devices reaching the same preselected reference value.

5. In a weighing device for weighing both single and tandem axle assemblies of vehicles where a first load limit $x$ is predetermined for the wheels of a single axle support assembly of a vehicle and a second load limit $y$ is predetermined for a tandem axle support assembly of a vehicle; a first scale; a second scale spaced from but near to said first scale, said scales being situated in the path of a vehicle to be weighed to support, in the case of a tandem axle assembly, simultaneously and respectively the loads of such tandem axles one upon each scale; said first scale being constructed and arranged to produce a weight signal $S_1$ at a selected ratio $r$ to a weight signal $S_2$ which said second scale is constructed and arranged to produce, such ratio being determined as follows:

$$r = \frac{S_1}{S_2} = \frac{2x-y}{y}$$

means for combining such signals $S_1$ and $S_2$ occurring simultaneously; an alarm signal producing device; and means for actuating such device in response to $S_2$ alone or the sum of $S_1$ and $S_2$ reaching the same common reference value not less than a selected limit which is a function of $x$, whereby the same alarm signal producing device is common for both single and tandem axle assembly load limits.

6. In an overload detection device for both single and multiple axle assemblies of vehicles where a first load limit $x$ is predetermined for the wheels of a single axle assembly of a vehicle and a second load limit $y$ is predetermined for a multiple axle assembly of a vehicle; a plurality of scales; said scales being situated in the path of a vehicle to be weighed to support, in the case of a multiple axle assembly, simultaneously and respectively, the loads of such multiple axles one upon each scale; said first scale being constructed and arranged to produce a signal $S_1$ at a selected ratio $r$ to the signals $S_2$ produced by each of said other scales, such ratio being determined as follows:

$$r = \frac{S_1}{S_2} = \frac{zx-y}{(z-1)y}$$

where $z$ is the number of axles of the assembly, means for combining such signals $S_1$ and $S_2$ occurring simultaneously; and common means for indicating one of such signals reaching a selected value related to $x$ and also for indicating such combined signals reaching such selected value.

7. In a device for detecting overloads of both single and tandem axle assemblies of vehicles where a first load limit $x$ is predetermined for the wheels of a single axle assembly and a second load limit $y$ is predetermined for a tandem axle assembly; a first scale having a weighing platform; a second scale having a weighing platform, said weighing platforms being situated in the path of a vehicle to be weighed, to support, in the case of a tandem axle assembly, simultaneously and respectively the two loads of such tandem axles, one upon each weighing platform; said first scale including means for producing a signal $S_1$ responsive to the weight on its weighing platform, said second scale including means for producing a signal $S_2$ responsive to the weight upon its weighing platform, one of said signal-producing means producing its signal at a selected ratio $r$ to the signal produced by the other signal-producing means, such ratio being determined as follows:

$$r = \frac{2x-y}{y}$$

an alarm signal-producing device; and combining means operatively connected to said scales and operable by simultaneously occurring signals $S_1$ and $S_2$ which occur simultaneously for actuating said alarm signal-producing device in response to the combination of said signals $S_1$ and $S_2$ reaching a reference value bearing a preselected relationship to $x$, said combining means also being operable by the signal $S_2$ occurring alone and reaching the same reference value.

8. An overload detection device having in combination: a first and a second weighing platform situated side-by-side in spaced relation for supporting successively each of the axles of a vehicle moving upon a road surface, and in the case of a tandem axle assembly of such vehicle for supporting upon one such platform the wheels of a first axle of such assembly and simultaneously upon the other platform the wheels of the second axle thereof; a first group of weighing cells for supporting said first platform; a second group of weighing cells for supporting said second platform; each of such cells including stress receiving column means carrying strain gauge means; a first electrical circuit in which the strain gauge means of said first group of weighing cells are connected including means for applying input electrical energy to the strain gauge means thereof, said circuit including such cells producing an output energy proportional to such input energy and to the stress upon said first group of cells; a second electrical circuit in which the strain gauge means of said second group of cells are connected for applying input electrical energy to such strain gauge means, said circuit including said second group of cells also producing an output energy proportional to its input energy and to the stress upon said second group of cells, said electrical circuits being electrically connected for combining the output energies simultaneously occurring of the weighing cells of both of said groups, such output energy being attributable to loads simultaneously upon said platforms, one of said circuits applying a selected different input energy to the strain gauge means thereof as compared to the input energy of the strain gauge means of the other platform; a source of reference electrical energy of selected value; means for comparing such reference energy with the combined output energies of said weighing cells; and signal means operatively connected to said energy comparing means, the latter being adapted for actuating said signal means in response to said combined cell output energies reaching a reference value bearing a selected relation to that of said reference energy and also for actuating said signal means in response to the output energy of one of said groups of weighing cells reaching the same reference value.

9. An overload detection device having in combination: a first and a second weighing platform situated side-by-side in spaced relation for supporting successively each of the axles of a vehicle moving upon a road surface and in the case of a tandem axle assembly of such a vehicle for supporting upon one such platform the wheels of a first axle of such assembly and simultaneously upon the other platform the wheels of the second axle thereof; a first group of weighing cells for supporting said first platform and a second group of weighing cells for supporting said second platform, each such cell including stress receiving column means carrying strain gauge means; a first electrical circuit in which the strain gauge means of said first group of weighing cells are connected including means for applying input electrical energy to such strain gauge means, said circuit including such cells producing an output energy proportional to such input energy and to the stress upon said first group of cells; a second electrical circuit in which the strain gauge means of said second group of cells are connected including means for applying input electrical energy to such strain gauge means, said circuit including said second group of cells also producing an output energy proportional to its input energy and to the stress upon said second group of cells, said electrical circuits being electrically connected for combining the output energies simultaneously occurring of the weighing cells of both of said groups, such output energy being attributable to the loads simultaneously upon said platforms, the input energy applying means of one of said circuits applying a selected different input energy to the strain gauge means thereof as compared to the input energy of the other platform in accordance with the ratio $$\frac{2x-y}{y}$$

where $x$ is the load limit for a single axle assembly and $y$ is the load limit for a tandem axle assembly of a vehicle; a source of reference electrical energy of selected value related to $x$; and means for comparing such reference energy with the combined output energies of said weighing cells and with the output energy of one of said groups of cells.

10. In apparatus of the class described: a first and a second weighing platform situated side-by-side in spaced relation for supporting successively each of the axles of a vehicle moving upon a road surface and in the case of a tandem axle assembly of such a vehicle for supporting upon one such platform the wheels of a first axle of such tandem assembly and simultaneously upon the other platform the wheels of the second axle thereof; a first force sensitive means for supporting said first platform and a second force sensitive means for supporting said second platform, one of said force sensitive means producing output energy as a function of the weight upon its respective platform, the other force sensitive means producing output energy proportional to the weight upon its respective platform, means for combining such output energies simultaneously occurring attributable to the loads simultaneously upon said platforms; means for controlling the output energy of one of such force sensitive means to be in a selected quantitative relation to the output energy of the other of such force sensitive means in accordance with the expression $$\frac{2x-y}{y}$$

where $x$ and $y$ are the load limits for single and tandem axles respectively; and means for detecting a single output energy or such combined output energies reaching a common value bearing a selected relation to $x$.

11. In apparatus of the class described: a first force sensitive means, a second force sensitive means, one of said force sensitive means producing output energy as a function of the force exerted upon it, the other force sensitive means producing output energy proportional to the force exerted upon it, means for combining such output energies simultaneously occurring attributable to such forces simultaneously exerted thereupon, means for controlling the output energy of one of such force sensitive means to be in a selected quantitative relation to the output energy of the other of such force sensitive means in accordance with the expression $$\frac{2x-y}{y}$$

where $x$ and $y$ are preselected differing force limits, means for detecting said combined output energies reaching a reference value bearing a selected relation to one of such limits, said same latter means also being constructed and arranged for detecting the output energy of one of said devices reaching the same reference value.

12. In apparatus of the class described: a first force sensitive means, a second force sensitive means, such force sensitive means producing output energies which are respectively functions of the forces exerted respectively thereupon, means for combining such output energies simultaneously occurring attributable to such forces simultaneously exerted thereupon, means for controlling the output energy of one of such force sensitive means to be in a selected quantitative relation to the output energy of the other of such force sensitive means in accordance with the expression $$\frac{2x-y}{y}$$

where $x$ and $y$ are preselected differing force values, and means for detecting said combined output energies reaching a preselected value, said same latter means also being constructed and arranged for detecting the output energy of one of said devices reaching the same reference value.

13. A weighing device for both single and tandem axle vehicles having in combination with a road surface a first and a second weighing platform situated in series in said road surface, the upper surfaces of such platforms being substantially on the same level with the level of such road surface and spaced for respectively supporting simultaneously the wheels of a first and second tandem axle assembly of a vehicle, each of said platforms being supported by a plurality of weighing cells, each cell including stress receiving column means carrying strain gauge means, an electrical circuit in which said strain gauge means are connected for producing a voltage responsive to the stress upon said cells, said circuit including means for producing a cell output voltage representative of the total of the voltages of said strain gauge means occurring simultaneously due to loads simultaneously upon said platforms, said electrical circuit also including means for providing a first input voltage ($e_1$) for the strain gauge means of such cells supporting said first platform and a second and different input voltage ($e_2$) for the strain gauge means of the weighing cells supporting said second platform, the ratio of said input voltages being determined in accordance with the following:

$$\frac{e_1}{e_2} = \frac{2x-y}{y}$$

where $x$ is a predetermined load limit to be supported by the tires of a single axle of a vehicle and $y$ is a predetermined load limit to be supported by the tires of a tandem axle of a vehicle; said electrical circuit being adapted for producing a cell output voltage which is a function of the weight upon said platforms; signal means; and means operatively connected to said circuit and said signal means for actuating such signal means in response to said cell output voltage reaching a preselected value.

14. A weighing device for both single and tandem axle vehicles having in combination with a road surface a first and a second weighing platform situated in series in said road surface, such platforms being spaced for respectively supporting simultaneously the wheels of a first and a second tandem axle assembly of a vehicle, each of said platforms being supported by a plurality of weighing cells, each cell including stress receiving column means carrying strain gauge means, an electrical circuit in which said strain gauge means are connected for producing energy responsive to the stress upon said cells, said circuit including energy combining means for producing a cell output energy representative of the combined energy of said strain gauge means occurring simultaneously due to loads simultaneously upon said platforms, said electrical circuit also including means for providing a first input energy for the strain gauge means of the cells supporting said first platform and a second and different input energy for the strain gauge means of the weighing cells supporting said second platform, the ratio of said input energies being determined in accordance with the following:

$$\frac{2x-y}{y}$$

where $x$ is a predetermined load limit to be supported by the wheels of a single axle of a vehicle and $y$ is a predetermined load limit to be supported by the wheels of a tandem axle of a vehicle; and common indicator means operatively connected to said circuit for indicating said cell output energies of one or both of said platforms reaching a preselected common reference value bearing a selected relation to $x$.

15. In apparatus of the class described: a plurality of means each responsive to a physical quantity, electrical means associated with said physical quantity responsive means for producing a like plurality of electrical parameters respectively in response to the physical quantities acting upon said first-mentioned plurality of means, means for combining such parameters attributable to physical quantities acting simultaneously upon two or more of such first-mentioned plurality of means, means for controlling the parameter of all but a selected one of such first-mentioned means to be in a selected relation to the parameter of such selected physical quantity responsive means in accordance with the expression $$\frac{zx-y}{(z-1)y}$$

where $x$ and $y$ are preselected limit values of differing physical quantities and $z$ is the number of such means responsive to physical quantities, and a single detector means for detecting a single such parameter of such selected physical quantity responsive means or such combined parameters reaching a common reference value bearing a selected relation to one of said limit values.

16. In apparatus of the class described, a first means responsive to a physical quantity, a second means responsive to a physical quantity, electrical means associated with said first and second means for producing a first and a second electrical parameter in response respectively to the physical quantities acting on said first and second means, means for combining such parameters attributable to physical quantities simultaneously acting on such means, means for controlling the parameter of one of said means to be in a selected relation to the parameter of the other means in accordance with the expression $$\frac{2x-y}{y}$$

where $x$ and $y$ are preselected differing limit values of physical quantities, and a common means for detecting either a single such parameter or the parameters combined by such combining means reaching a value bearing a selected relation to one of such limit values.

(References on following page)

References Cited in the file of this patent

UNITED STATES PATENTS

| | | |
|---|---|---|
| 1,621,093 | Troll | Mar. 15, 1927 |
| 2,421,222 | Schaevitz | May 27, 1947 |
| 2,735,291 | Quinn | Feb. 21, 1952 |
| 2,597,751 | Ruge | May 20, 1952 |
| 2,678,206 | Muldoon et al. | May 11, 1954 |
| 2,686,426 | Kolisch | Aug. 17, 1954 |
| 2,767,974 | Ballard et al. | Oct. 23, 1956 |

OTHER REFERENCES

An article in "Electronics," Scale Weighs Moving, January 1956, pp. 142–143, copy in Div. 36, 265–27.

UNITED STATES PATENT OFFICE

CERTIFICATION OF CORRECTION

Patent No. 2,962,274                                November 29, 1960

Arthur L. Thurston

It is hereby certified that error appears in the above numbered patent requiring correction and that the said Letters Patent should read as corrected below.

Column 2, line 60, for "means", first occurrence, read -- devices --; column 8, line 26, for "outright" read -- output --; line 31, for "On this cast" read -- In this case --; column 12, line 32, for "x" read -- (x) --; line 33, for "y" read -- (y) --; line 41, for "$S_1$ at a selected ratio r" read -- ($S_1$) at a selected ratio (r) --; line 42, for "$S_2$" read -- ($S_2$) --; line 58, for "x" read -- (x) --; line 59, for "y" read -- (y) --; same column 12, line 66, for "$S_1$ at a selected ratio r to the signals $S_2$" read -- ($S_1$) at a selected ratio (r) to the signals ($S_2$) --.

Signed and sealed this 9th day of May 1961.

(SEAL)
Attest:

ERNEST W. SWIDER
Attesting Officer

DAVID L. LADD
Commissioner of Patents